(12) United States Patent
Shimokawa

(10) Patent No.: US 8,999,533 B2
(45) Date of Patent: Apr. 7, 2015

(54) MAGNETIC DISK AND METHOD OF MANUFACTURING THE SAME

(75) Inventor: Koichi Shimokawa, Shinjuku-ku (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 671 days.

(21) Appl. No.: 12/744,862

(22) PCT Filed: Mar. 27, 2009

(86) PCT No.: PCT/JP2009/056290
§ 371 (c)(1),
(2), (4) Date: May 26, 2010

(87) PCT Pub. No.: WO2009/123052
PCT Pub. Date: Oct. 8, 2009

(65) Prior Publication Data
US 2010/0304186 A1   Dec. 2, 2010

(30) Foreign Application Priority Data

Mar. 30, 2008  (JP) ................. 2008 088953

(51) Int. Cl.
*G11B 5/65* (2006.01)
*G11B 5/725* (2006.01)
*C10M 107/38* (2006.01)
*G11B 5/84* (2006.01)

(52) U.S. Cl.
CPC ............. *G11B 5/725* (2013.01); *C10M 107/38* (2013.01); *G11B 5/8408* (2013.01); *C10M 2213/043* (2013.01); *C10N 2240/204* (2013.01)

(58) Field of Classification Search
None
See application file for complete search history.

(56) References Cited

U.S. PATENT DOCUMENTS

| | | | | |
|---|---|---|---|---|
| 8,178,480 | B2 * | 5/2012 | Hamakubo et al. | 508/582 |
| 2003/0100454 | A1 * | 5/2003 | Osawa et al. | 508/111 |
| 2006/0052262 | A1 | 3/2006 | Akada et al. | |
| 2007/0060487 | A1 * | 3/2007 | Burns et al. | 508/582 |

FOREIGN PATENT DOCUMENTS

| | | |
|---|---|---|
| JP | 62-066417 A | 3/1987 |
| JP | 2001-052328 A | 2/2001 |
| JP | 2001-164279 A | 6/2001 |
| JP | 2002-074648 A | 3/2002 |
| JP | 2003-162810 A | 6/2003 |
| WO | 2004/031261 A1 | 4/2004 |
| WO | 2008/038799 A1 | 4/2008 |

* cited by examiner

*Primary Examiner* — Holly Rickman
*Assistant Examiner* — Linda Chau

(57) ABSTRACT

Provided is a magnetic disk comprising a lubricating layer formed of a lubricant. The lubricant constituting the lubricating layer has excellent properties, for example, excellent fluidity, surface energy, and CFT properties. By virtue of the excellent properties, the magnetic disk has a high level of reliability despite a low flying height of a magnetic head due to a recent rapid increase in recording density and a very severe environment resistance requirement due to diversification of applications. The magnetic disk comprises a substrate and at least a magnetic layer, a protective layer, and a lubricating layer provided in that order over the substrate. The lubricating layer is formed of a lubricant that is a mixture of a specific perfluoropolyether lubricant with a lubricant formed of a compound comprising perfluoropolyether groups having a perfluoropolyether main chain in the structure thereof and having a hydroxyl group at the end thereof, the perfluoropolyether groups being bonded to each other through a divalent linking group having at least two hydroxyl groups in the structure thereof.

3 Claims, 1 Drawing Sheet

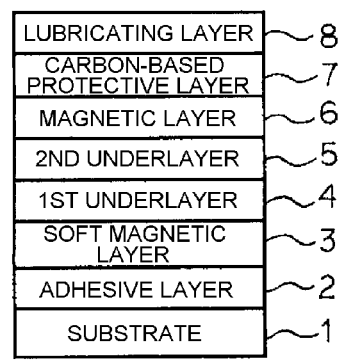
MAGNETIC DISK 10

MAGNETIC DISK AND METHOD OF MANUFACTURING THE SAME

TECHNICAL FIELD

This invention relates to a magnetic disk adapted to be mounted in a magnetic disk device such as a hard disk drive (hereinafter abbreviated as a HDD) and to a method of manufacturing the same.

BACKGROUND ART

Various information recording techniques have been developed following the increase in volume of information processing in recent years. Particularly, the areal recording density of HDDs using the magnetic recording technique has been increasing at an annual rate of about 100%. Recently, the information recording capacity exceeding 60 GB has been required per 2.5-inch magnetic disk adapted for use in a HDD or the like. In order to satisfy such a requirement, it is necessary to realize an information recording density exceeding 100 Gbits/inch$^2$. In order to achieve the high recording density in a magnetic disk for use in a HDD or the like, it is necessary to reduce the size of magnetic crystal grains forming a magnetic recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the advance in size reduction of magnetic crystal grains, there has been the occurrence of a thermal fluctuation phenomenon where the thermal stability of recorded signals is degraded due to superparamagnetism so that the recorded signals are lost. This has been an impeding factor for the increase in recording density of the magnetic disks.

In order to solve this impeding factor, magnetic recording media of the perpendicular magnetic recording type have been proposed in recent years. In the case of the perpendicular magnetic recording type, as is different from the case of the in-plane magnetic recording type, the easy magnetization axis of a magnetic recording layer is adjusted so as to be oriented in a direction perpendicular to the surface of a substrate. As compared with the in-plane recording type, the perpendicular magnetic recording type can suppress the thermal fluctuation phenomenon and thus is suitable for increasing the recording density. As such a perpendicular magnetic recording medium, there is known a so-called two-layer perpendicular magnetic recording disk comprising, over a substrate, a soft magnetic underlayer made of a soft magnetic substance and a perpendicular magnetic recording layer made of a hard magnetic substance, as is described in, for example, JP-A-2002-74648.

In the meantime, a conventional magnetic disk has a protective layer and a lubricating layer on a magnetic recording layer formed over a substrate, for the purpose of ensuring the durability and reliability of the magnetic disk. Particularly, the lubricating layer used at the outermost surface is required to have various properties such as long-term stability, chemical substance resistance, friction properties, and heat resistance.

In order to satisfy such a requirement, perfluoropolyether-based lubricants having hydroxyl groups in molecules have often been used conventionally as lubricants for magnetic disks. For example, according to JP-A-S62-66417 (Patent Document 1) or the like, there is known a magnetic recording medium or the like coated with a perfluoroalkylpolyether lubricant having a structure of $HOCH_2CF_2O(C_2F_4O)_p(CF_2O)_qCH_2OH$. It is known that when hydroxyl groups are present in molecules of a lubricant, the adhesion properties of the lubricant to a protective layer can be obtained by the interaction between the protective layer and the hydroxyl groups.

Patent Document 1: JP-A-S62-66417

DISCLOSURE OF THE INVENTION

Problem to be Solved by the Invention

As described above, the information recording density of 100 Gbits/inch$^2$ or more has been required in recent HDDs. One reason for this is related to the fact that, in addition to the conventional need as storage devices for computers, the HDDs have been mounted in mobile phones, car navigation systems, digital cameras, and so on.

In the case of these new uses, since the housing space for mounting the HDD is extremely small as compared with that of the computer, it is necessary to miniaturize the HDD. For this, it is necessary to reduce the diameter of a magnetic disk to be mounted in the HDD. For example, a 3.5-inch or 2.5-inch magnetic disk can be used for the computer use, but in the case of the above-mentioned new uses, use is made of a small-diameter magnetic disk of, for example, 1.8 inches to 0.8 inches smaller in diameter than the magnetic disk for the computer use. It is necessary to store a certain or more information volume even when the magnetic disk is reduced in diameter as described above, thus resulting in acceleration of improvement in information recording density.

Further, in order to effectively use the limited disk area, use has been made of a HDD of the LUL (Load Unload) system instead of the conventional CSS (Contact Start and Stop) system. In the LUL system, a magnetic head is retreated to an inclined platform called a ramp located outside a magnetic disk while the HDD is stopped, then in a start-up operation, the magnetic head is caused to slide from the ramp, after the magnetic disk starts to rotate, so as to fly over the magnetic disk to perform recording/reproduction. In a stop operation, the magnetic head is retreated to the ramp outside the magnetic disk, then the rotation of the magnetic disk is stopped. This sequence of the operations is called a LUL operation. In the magnetic disk mounted in the HDD of the LUL system, it is not necessary to provide a contact sliding region (CSS region) for the magnetic head, which is required in the CSS system, thus it is possible to increase a recording/reproducing region and therefore the LUL system is preferable for increasing the information capacity.

In order to improve the information recording density under these circumstances, it is necessary to reduce a spacing loss as much as possible by reducing the flying height of the magnetic head. In order to achieve the information recording density of 100 Gbits/inch$^2$ or more, it is necessary to set the flying height of the magnetic head to 10 nm or less. In the LUL system, as is different from the CSS system, since it is not necessary to provide an uneven shape for CSS on the surface of the magnetic disk, it is possible to significantly smooth the surface of the magnetic disk. Consequently, in the case of the magnetic disk mounted in the HDD of the LUL system, the flying height of the magnetic head can be further reduced as compared with the CSS system and therefore there is also an advantage that it is possible to increase the S/N ratio of a recording signal and thus to contribute to an increase in recording capacity of the magnetic disk device.

Because of the further reduction in magnetic head flying height following the recent introduction of the LUL system, it has become necessary that the magnetic disk stably operate even in the case of the low flying height of 10 nm or less. Especially, as described above, the magnetic disks have been shifted from the in-plane magnetic recording type to the perpendicular magnetic recording type in recent years, so that an increase in capacity of the magnetic disks and a reduction in flying height following it have been strongly demanded.

When the flying height of a magnetic head becomes a low flying height of, for example, 10 nm or less, the magnetic head repeatedly exerts adiabatic compression and adiabatic expansion on a lubricating layer on the surface of a magnetic disk through air molecules while flying, so that the lubricating layer tends to be repeatedly subjected to heating and cooling and therefore a reduction in molecular weight of a lubricant forming the lubricating layer tends to be promoted. If the molecular weight of the lubricant is reduced, its fluidity increases so that its adhesion to a protective layer decreases. Then, it is considered that the lubricant with the increased fluidity is transferred and deposited on the magnetic head located in the extremely close positional relationship to make the flying posture thereof unstable, thus causing a fly stiction failure. Particularly, a recently introduced magnetic head with a NPAB (negative pressure) slider is considered to promote the transfer deposition phenomenon because it tends to suck the lubricant due to a strong vacuum created at the bottom surface of the magnetic head. The transferred and deposited lubricant may produce an acid such as hydrofluoric acid to thereby corrode an element portion of the magnetic head. Particularly, a magnetic head mounted with a magnetoresistive effect element tends to be corroded.

On the other hand, if the fluidity of the lubricant is low, the lubricant loses its recoverability and thus cannot exhibit suitable lubrication performance. Therefore, it is an important subject for the lubricant to have proper recoverability particularly with the low flying height.

If the surface energy of the formed lubricating layer is high, water, organic contaminants, or the like tends to be adsorbed on the surface of the lubricating layer. Therefore, particularly with the low flying height, the possibility is high that the water, the organic contaminants, or the like adsorbed on the surface of the lubricating layer is transferred onto the magnetic head.

Further, recently, in order to increase the response speed of a magnetic disk device, the rotational speed of a magnetic disk is increased. For example, a small-diameter 1.8-inch magnetic disk device suitable for a mobile application enhances its response characteristics by rotating a magnetic disk at a high speed of 5400 rpm or more. When the magnetic disk is rotated at such a high speed, a lubricating layer moves (migrates) due to a centrifugal force caused by the rotation so that the thickness of the lubricating layer becomes nonuniform in the plane of the magnetic disk, resulting in actualization of a failure due to a contact between the surface of the magnetic disk and a magnetic head at its low flying height.

As described before, recently, magnetic disk devices have started to be often used not only as conventional storage devices of personal computers, but also as storage devices for mobile applications such as mobile phones and car navigation systems and, therefore, due to diversification of use applications, the environmental resistance required for magnetic disks has become very strict. Therefore, in view of these circumstances, it is urgently necessary, more than conventional, to further improve the durability of the surfaces of magnetic disks and the properties, such as, for example, fluidity, surface energy, and fixed-point flying properties (CFT properties), of lubricants forming lubricating layers.

Following the rapid improvement in information recording density of magnetic disks in recent years, it is required to reduce the magnetic spacing between a magnetic head and a recording layer of a magnetic disk and, therefore, it has become necessary to further reduce the thickness of a lubricating layer present between the magnetic head and the recording layer of the magnetic disk. A lubricant used as the lubricating layer at the outermost surface of the magnetic disk largely affects the durability of the magnetic disk. Even if the thickness of the lubricating layer is reduced, the stability and reliability are essential for the magnetic disk.

As described above, it is required to realize a magnetic disk excellent in long-term stability of a lubricating layer and having high reliability despite the reduction in magnetic spacing and the low flying height of a magnetic head following the increase in recording density in recent years and, further, due to diversification of use applications and so on, the environmental resistance required for magnetic disks has become very strict. Therefore, it is required, more than conventional, to further improve the durability of the surfaces of magnetic disks and the properties of lubricants forming lubricating layers.

This invention has been made in view of these conventional circumstances and has an object to provide a magnetic disk that is excellent in properties such as, particularly, fluidity, surface energy, and CFT properties, of a lubricant forming a lubricating layer and thus has high reliability despite the low flying height of a magnetic head following the rapid increase in recording density in recent years and despite the very strict environmental resistance following the diversification of applications, and to provide a method of manufacturing such a magnetic disk.

Means for Solving the Problem

As a result of intensive studies on a lubricant for a magnetic disk, the present inventor has found that the above-mentioned problems can be solved by the following inventions, and has completed this invention.

Specifically, this invention has the following configurations.

(Configuration 1)

A magnetic disk having at least a magnetic layer, a protective layer, and a lubricating layer provided in this order over a substrate, wherein the lubricating layer is formed by a film of a lubricant c containing a lubricant a containing at least one compound selected from a compound represented by a chemical formula

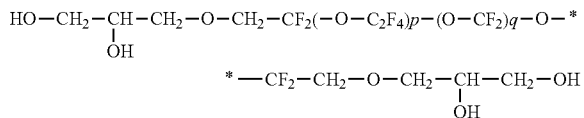

[Chemical Formula 1]

[in the formula, p and q are natural numbers]
and a compound represented by a chemical formula

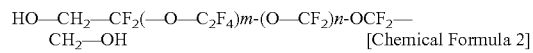

[Chemical Formula 2]

[in the formula, m and n are natural numbers]
and a lubricant b containing a compound in which perfluoropolyether groups each having a perfluoropolyether main chain in a structure thereof and each having a hydroxyl group at an end thereof are bonded to each other through a divalent linking group having at least two hydroxyl groups in a structure thereof.

(Configuration 2)

In the magnetic disk according to Configuration 1, a number-average molecular weight (Mn) of the lubricant b is in a range of 1000 to 10000.

(Configuration 3)

In the magnetic disk according to Configuration 1 or 2, a weight ratio of the lubricant a/the lubricant b in the lubricant c is 8:2 to 2:8.

(Configuration 4)

In the magnetic disk according to any one of Configurations 1 to 3, the protective layer is a carbon-based protective layer formed by a plasma CVD method.

(Configuration 5)

The magnetic disk according to any one of Configurations 1 to 4 is adapted to be mounted in a magnetic disk device of a load unload system.

(Configuration 6)

A method of manufacturing a magnetic disk, the method forming at least a magnetic layer, a protective layer, and a lubricating layer in this order over a substrate, wherein the method comprises preparing a lubricant a having a weight-average molecular weight (Mw) of 3000 to 7000 and a molecular weight dispersion of 1.2 or less by performing molecular weight fractionation of a lubricant a containing at least one compound selected from a compound represented by a chemical formula

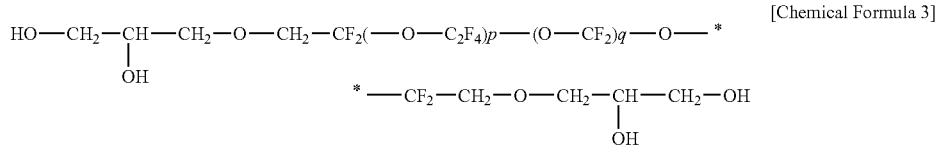
[Chemical Formula 3]

[in the formula, p and q are natural numbers]
and a compound represented by a chemical formula

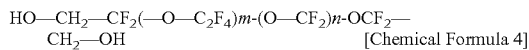
[Chemical Formula 4]

[in the formula, m and n are natural numbers], preparing a lubricant b comprising a compound in which perfluoropolyether groups each having a perfluoropolyether main chain in a structure thereof and each having a hydroxyl group at an end thereof are bonded to each other through a divalent linking group having at least two hydroxyl groups in a structure thereof, preparing a lubricant c in the form of a mixture of the lubricant a and the lubricant b, and forming a film of the lubricant c on the protective layer, thereby forming the lubricating layer.

(Configuration 7)

In the method of manufacturing a magnetic disk according to Configuration 6, the molecular weight fractionation is performed by a supercritical fluid extraction method.

(Configuration 8)

The method of manufacturing a magnetic disk according to Configuration 6 or 7 comprises exposing the magnetic disk to an atmosphere at 50° C. to 150° C. after forming the lubricating layer.

According to the invention of Configuration 1, the magnetic disk has at least the magnetic layer, the protective layer, and the lubricating layer provided in this order over the substrate, wherein the lubricating layer is formed by the film of the lubricant c containing the mixture of the specific lubricant compounds, i.e. the lubricant a and the lubricant b. Therefore, there is obtained the magnetic disk that is excellent in properties such as, particularly, fluidity, surface energy, and CFT properties, of the lubricant forming the lubricating layer and thus has high reliability despite the low flying height of a magnetic head following the rapid increase in recording density in recent years and further despite the very strict environmental resistance following the diversification of applications.

According to the invention of Configuration 2, the number-average molecular weight (Mn) of the lubricant b is particularly preferably in the range of 1000 to 10000. This is because when it is used as a mixture with the lubricant a, it can have recoverability with proper viscosity to exhibit suitable lubrication performance and further have excellent heat resistance.

According to the invention of Configuration 3, the weight ratio of the lubricant a/the lubricant b in the lubricant c is particularly preferably 8:2 to 2:8 because the operation and effect of this invention can be suitably exhibited.

According to the invention of Configuration 4, the protective layer is particularly preferably the carbon-based protective layer formed by the plasma CVD method. This is because the carbon-based protective layer with a uniform and dense surface can be formed by the plasma CVD method, which is suitable for this invention.

According to the invention of Configuration 5, the magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of the low flying height of 10 nm or less. Therefore, the magnetic disk of this invention having high reliability even with the low flying height is suitable.

According to the invention of Configuration 6, the method of manufacturing the magnetic disk having at least the magnetic layer, the protective layer, and the lubricating layer provided in this order over the substrate prepares the lubricant a and the lubricant b, further prepares the lubricant c in the form of the mixture of them, and forms the film of the lubricant c on the protective layer, thereby forming the lubricating layer. Therefore, there is obtained the magnetic disk that is excellent in properties such as, particularly, fluidity, surface energy, and CFT properties, of the lubricant forming the lubricating layer and thus has high reliability despite the low flying height of a magnetic head following the rapid increase in recording density in recent years and further despite the very strict environmental resistance following the diversification of applications.

According to the invention of Configuration 7, the molecular weight fractionation is preferably performed by the supercritical fluid extraction method.

According to the invention of Configuration 8, the magnetic disk is exposed to an atmosphere at 50° C. to 150° C.

after forming the lubricating layer so that it is possible to further improve the adhesion of the formed lubricating layer to the protective layer.

Effect of the Invention

According to this invention, it is possible to provide a magnetic disk that is excellent in properties such as, particularly, fluidity, surface energy, and CFT properties, of a lubricant forming a lubricating layer and thus has high reliability despite the low flying height of a magnetic head following the rapid increase in recording density in recent years and further despite the very strict environmental resistance following the diversification of applications.

BEST MODE FOR CARRYING OUT THE INVENTION

Hereinbelow, this invention will be described in detail based on an embodiment thereof.

A magnetic disk of this invention is a magnetic disk having at least a magnetic layer, a protective layer, and a lubricating layer provided in this order over a substrate, wherein the lubricating layer is formed by a film of a lubricant c containing a lubricant a containing at least one compound selected from a compound (hereinafter referred to as the lubricant compound (I) according to this invention) represented by a chemical formula

[Chemical Formula 5]

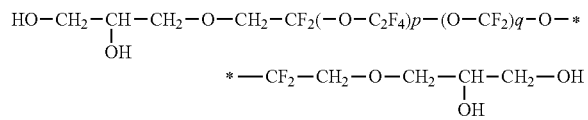

[in the formula, p and q are natural numbers]
and a compound (hereinafter referred to as the lubricant compound (II) according to this invention) represented by a chemical formula HO—$CH_2$—$CF_2$(—O—$C_2F_4$)$m$-(O—$CF_2$)$n$-$OCF_2$—
$CH_2$—OH [Chemical Formula 6]

[in the formula, m and n are natural numbers]
and a lubricant b containing a compound (hereinafter referred to as the lubricant compound (III) according to this invention) in which perfluoropolyether groups each having a perfluoropolyether main chain in a structure thereof and each having a hydroxyl group at an end thereof are bonded to each other through a divalent linking group having at least two hydroxyl groups in a structure thereof.

The lubricant compound (I) according to this invention contained in the lubricating layer in the magnetic disk of this invention is a perfluoropolyether-based compound having a perfluoropolyether main chain in a structure thereof and having four hydroxyl groups at ends thereof. The lubricant compound (II) according to this invention is a perfluoropolyether-based compound having a perfluoropolyether main chain in a structure thereof and having two hydroxyl groups at ends thereof. As these perfluoropolyether-based lubricants, use can be made of, for example, as commercial products, Fomblin Z-Tetraol (trade name) and Fomblin Z-DOL (trade name) manufactured by Solvay Solexis, Inc.

The lubricant (III) according to this invention is a compound in which perfluoropolyether groups each having a perfluoropolyether main chain in a structure thereof and each having a hydroxyl group at an end thereof are bonded to each other through a divalent linking group having at least two hydroxyl groups in a structure thereof.

The above-mentioned divalent linking group is satisfactory if it has at least two hydroxyl groups in a structure thereof, and is, for example, a group having a group represented by —($CR_1R_2$)— where $R_1$ and $R_2$ are each a hydrogen atom or a hydroxyl group.

The above-mentioned perfluoropolyether group has, in a structure thereof, a perfluoropolyether main chain represented by, for example, —(O—$C_2F_4$)m-(O—$CF_2$)n- (m and n are each an integer of 1 or more) and has a hydroxyl group at an end thereof. A group represented by, for example, the following formula (I) is preferably cited as such a perfluoropolyether group.

Formula (I)

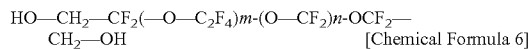

$HOCH_2CF_2(OC_2F_4)m(OCF_2)nOCF_2CH_2O$— [Chemical Formula 7]

In the formula, m and n are each an integer of 1 or more.

As a method of manufacturing the lubricant (III) according to this invention, there is preferably cited, for example, a manufacturing method in which 2 equivalents of a perfluoropolyether compound having a perfluoropolyether main chain in a molecule and having a hydroxyl group at an end thereof are reacted with 1 equivalent of an aliphatic compound having structures each capable of reacting with the perfluoropolyether compound to produce a hydroxyl group.

As the above-mentioned aliphatic compound, there is preferably cited, for example, a diepoxy compound having epoxide structures at ends thereof. Using such a compound, it is possible to obtain the lubricant (III) according to this invention with high purity and high yield. Specific examples of such a diepoxy compound are given below, but this invention is not limited thereto.

[Chemical Formulas 8]

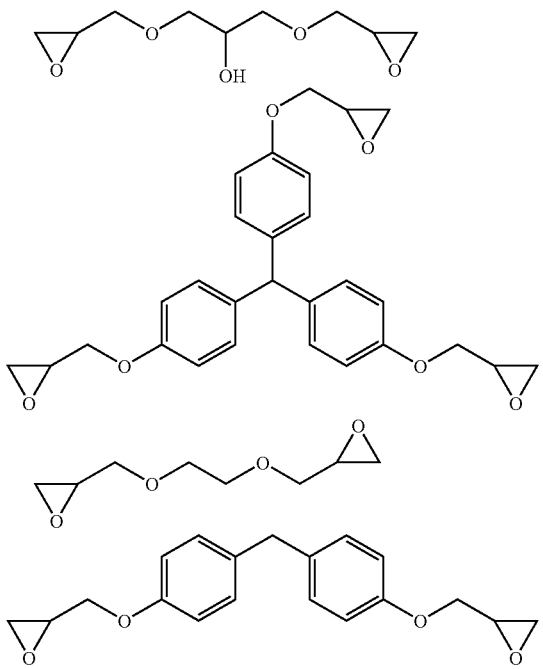

As the above-mentioned perfluoropolyether compound, there is cited, for example, a perfluorodiol compound having hydroxyl groups at molecular ends thereof, represented by the following formula (II).

Formula (II)

HOCH$_2$CF$_2$(OC$_2$F$_4$)$m$(OCF$_2$)$n$OCF$_2$CH$_2$OH   [Chemical Formula 9]

In the formula, m and n are each an integer of 1 or more.

Specifically, under a base condition, perfluoropolyether compounds each having hydroxyl groups at ends thereof are reacted with a base to obtain an alkoxide, then this alkoxide performs a nucleophilic ring-opening reaction with an aliphatic compound having epoxide structures at ends thereof, thereby obtaining a dimer compound in which the perfluoropolyether compounds are bonded to each other through a linking group changed from the aliphatic compound.

An exemplified compound of the lubricant (III) according to this invention is given below, but this invention is not limited thereto.

[Chemical Formula 10]

Exemplified Compound

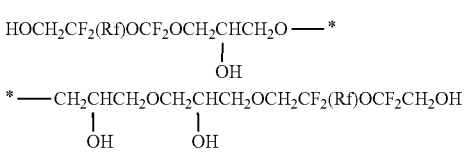

HOCH$_2$CF$_2$(Rf)OCF$_2$OCH$_2$CHCH$_2$O——*
                              |
                              OH
*——CH$_2$CHCH$_2$OCH$_2$CHCH$_2$OCH$_2$CF$_2$(Rf)OCF$_2$CH$_2$OH
        |              |
        OH             OH
Rf: ——(OC$_2$F$_4$)$m$(OCF$_2$)$n$——   m, n = an integer of 1 or more)

In this invention, as the lubricant forming the lubricating layer, use is made of the lubricant c containing the lubricant a containing at least one compound selected from the lubricant compound (I) according to this invention and the lubricant compound (II) according to this invention and the lubricant b containing the lubricant compound (III) according to this invention. Therefore, use is made of any one of combinations of the lubricant compound (I) according to this invention and the lubricant compound (III) according to this invention, of the lubricant compound (II) according to this invention and the lubricant compound (III) according to this invention, and of the lubricant compound (I) according to this invention, the lubricant compound (II) according to this invention, and the lubricant compound (III) according to this invention.

The molecular weight of each of the lubricants (I) and (II) according to this invention is not particularly limited, but in the case of using a commercial product, the weight-average molecular weight (Mw) is, for example, preferably in the range of about 3000 to 7000 and more preferably in the range of 4000 to 6000 by carrying out molecular weight fractionation by an appropriate method. Further, the molecular weight dispersion (ratio of weight-average molecular weight (Mw)/number-average molecular weight (Mn)) is preferably set to 1.2 or less by carrying out the molecular weight fractionation.

The molecular weight of the lubricant (III) according to this invention is also not particularly limited, but, for example, the number-average molecular weight (Mn) is preferably in the range of 1000 to 10000 and more preferably in the range of 1000 to 6000. This is because when it is used as a mixture with the lubricant a, it can have recoverability with proper viscosity to exhibit suitable lubrication performance and further have excellent heat resistance. Further, by carrying out molecular weight fractionation of the lubricant (III) according to this invention by an appropriate method, the molecular weight dispersion (ratio of weight-average molecular weight (Mw)/number-average molecular weight (Mn)) is preferably set to 1.2 or less.

In this invention, it is not necessary to particularly limit a method for molecular weight fractionation, but, for example, use can be made of molecular weight fractionation by a supercritical fluid extraction method, molecular weight fractionation by a gel permeation chromatography (GPC) method, or the like.

In this invention, use is made of the lubricant c in the form of the mixture of the lubricant a containing at least one compound selected from the lubricant compound (I) according to this invention and the lubricant compound (II) according to this invention and the lubricant b containing the lubricant compound (III) according to this invention, wherein the weight ratio of the lubricant a/the lubricant b in the lubricant c is particularly preferably 8:2 to 2:8 because the operation and effect of this invention can be suitably exhibited. More preferably, the weight ratio of the lubricant a/the lubricant b is 4:6 to 6:4.

When forming the lubricating layer by the use of the lubricant according to this invention, it can be formed by preparing the lubricant a having, for example, a weight-average molecular weight (Mw) of 3000 to 7000 and a molecular weight dispersion of 1.2 or less by carrying out molecular weight fractionation of a lubricant a containing at least one compound selected from the lubricant compound (I) according to this invention and the lubricant compound (II) according to this invention, preparing the lubricant b by properly carrying out molecular weight fractionation of the lubricant compound (III) according to this invention, preparing the lubricant c in the form of the mixture of the lubricant a and the lubricant b, and then coating a solution in which the lubricant c is dispersed and dissolved in an appropriate solvent, by, for example, a dipping method. As the solvent, use can be preferably made of, for example, a fluorine-based solvent (trade name Vertrel XF manufactured by DuPont-Mitsui Fluorochemicals Co., Ltd., or the like). A film forming method for the lubricating layer is, of course, not limited to the above-mentioned dipping method and use may be made of a film forming method such as a spin coating method, a spray method, or a paper coating method.

In this invention, in order to further improve the adhesion of the formed lubricating layer to the protective layer, the magnetic disk may be exposed to an atmosphere at 50° C. to 150° C. after the film formation.

In this invention, the thickness of the lubricating layer is preferably set to 4 to 18 Å. If it is less than 4 Å, there is a case where the lubrication performance as the lubricating layer is lowered. If it exceeds 18 Å, it is not preferable in terms of a reduction in film thickness, there is a case where the fly stiction failure occurs, and there is a case where the LUL durability is lowered.

As the protective layer in this invention, a carbon-based protective layer can be preferably used. Particularly, an amorphous carbon protective layer is preferable. With the protective layer being particularly the carbon-based protective layer, the interaction between the polar groups (particularly the hydroxyl groups) of the lubricant according to this invention and the protective layer is further enhanced so that the operation and effect of this invention are further exhibited, which is thus a preferable mode. The adhesion between the carbon-based protective layer and the lubricating layer can be controlled by forming the carbon-based protective layer of hydrogenated carbon and/or nitrogenated carbon and adjusting the content of hydrogen and/or nitrogen. In this case, the content of hydrogen is preferably set to 3 to 20 at % when measured by hydrogen forward scattering (HFS). The content of nitrogen is preferably set to 4 to 12 at % when measured by X-ray photoelectron spectroscopy (XPS).

In this invention, the carbon-based protective layer does not need to contain hydrogen and/or nitrogen uniformly over its entirety and is preferably a composition gradient layer containing, for example, nitrogen on its lubricating layer side and hydrogen on its magnetic layer side.

When using the carbon-based protective layer in this invention, it can be formed by, for example, a DC magnetron sputtering method, but it is preferably an amorphous carbon protective layer particularly formed by a plasma CVD method. Being formed by the plasma CVD method, the surface of the protective layer becomes uniform and dense. Therefore, it is preferable that the lubricating layer by this invention be formed on the protective layer with a smaller roughness formed by the CVD method.

In this invention, the thickness of the protective layer is preferably set to 20 to 70 Å. If it is less than 20 Å, there is a case where the performance as the protective layer is lowered. If it exceeds 70 Å, it is not preferable in terms of a reduction in film thickness.

In the magnetic disk of this invention, the substrate is preferably a glass substrate. The glass substrate is rigid and excellent in smoothness and thus is suitable for an increase in recording density. As the glass substrate, an aluminosilicate glass substrate, for example, is cited and, particularly, a chemically strengthened aluminosilicate glass substrate is preferable.

In this invention, the main surface of the substrate is preferably ultra-smooth with Rmax of 6 nm or less and Ra of 0.6 nm or less. The surface roughness Rmax and Ra herein referred to are based on the JIS B0601 standard.

The magnetic disk of this invention has at least the magnetic layer, the protective layer, and the lubricating layer provided over the substrate. In this invention, the magnetic layer is not particularly limited and may be an in-plane recording type magnetic layer or a perpendicular recording type magnetic layer. However, the perpendicular recording type magnetic layer is preferable for realizing the rapid increase in recording density in recent years. Particularly, if it is a CoPt-based magnetic layer, high coercive force and high reproduction output can be achieved, which is thus preferable.

In the magnetic disk of this invention, an underlayer may be provided between the substrate and the magnetic layer if necessary. Further, an adhesive layer, a soft magnetic layer, and so on may be provided between the underlayer and the substrate. In this case, as the underlayer, there is cited, for example, a Cr layer, a Ta layer, a Ru layer, a CrMo, CoW, CrW, CrV, or CrTi alloy layer, or the like and, as the adhesive layer, there is cited, for example, a CrTi, NiAl, or AlRu alloy layer or the like. Further, as the soft magnetic layer, there is cited, for example, a CoZrTa alloy film or the like.

The magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of a low flying height of 10 nm or less. Therefore, the magnetic disk of this invention having high reliability even with the low flying height is suitable.

EXAMPLES

Hereinbelow, this invention will be described in further detail with reference to Examples.

Example 1

FIG. 1 shows a magnetic disk 10 according to one Example of this invention.

The magnetic disk 10 has an adhesive layer 2, a soft magnetic layer 3, a first underlayer 4, a second underlayer 5, a magnetic layer 6, a carbon-based protective layer 7, and a lubricating layer 8 which are formed in this order on a substrate 1.

(Manufacture of Lubricant)

Molecular weight fractionation of Fomblin Z-Tetraol (trade name), manufactured by Solvay Solexis, Inc., containing the lubricant compound (I) according to this invention was carried out by the supercritical fluid extraction method, thereby preparing a lubricant a having Mw of 3000 and a molecular weight dispersion of 1.08. Further, the above-exemplified lubricant compound (lubricant compound (III) according to this invention) was prepared by reacting 2 equivalents of the perfluorodiol compound represented by the above-mentioned formula (II) with 1 equivalent of the above-exemplified diepoxy compound under a base condition. Specifically, both of the compounds were agitated in acetone and then refluxed, with sodium hydroxide added thereto. The conditions such as reaction temperature and time were suitably set, respectively. A lubricant comprising the compound thus obtained was properly subjected to molecular weight fractionation by the supercritical fluid extraction method, thereby preparing a lubricant b having Mn of 4000 measured by the NMR method and a molecular weight dispersion of 1.25. Then, the lubricant a and the lubricant b were mixed at a weight ratio of 1:1, thereby preparing a lubricant c.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 2.13 nm and Ra of 0.20 nm.

On the disk substrate 1, the Ti-based adhesive layer 2, the Fe-based soft magnetic layer 3, the first underlayer 4 of NiW, the second underlayer 5 of Ru, and the magnetic layer 6 of CoCrPt were formed in this order in an Ar gas atmosphere by the DC magnetron sputtering method. This magnetic layer was a perpendicular magnetic recording type magnetic layer.

Subsequently, the diamond-like carbon protective layer 7 was formed to a thickness of 50 Å by the plasma CVD method.

Then, the lubricating layer 8 was formed in the following manner.

There was prepared a solution in which the lubricant c manufactured as described above was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer 7 was immersed therein and coated therewith by the dipping method, thereby forming the lubricating layer 8.

After the film formation, the magnetic disk was heat-treated in a vacuum furnace at 130° C. for 90 minutes. The thickness of the lubricating layer 8 was measured by a Fourier transform infrared spectrophotometer (FTIR) and it was 12 Å. In this manner, the magnetic disk 10 of Example 1 was obtained.

Example 2

Molecular weight fractionation of a mixture, at a weight ratio of 1:1, of Fomblin Z-Tetraol (trade name), manufactured by Solvay Solexis, Inc., containing the lubricant compound (I) according to this invention and Fomblin Z-Diol (trade name), manufactured by Solvay Solexis, Inc., containing the lubricant compound (II) according to this invention was carried out by the supercritical fluid extraction method, thereby preparing a lubricant a having Mw of 3000 and a molecular weight dispersion of 1.08. Then, the lubricant a and a lubricant b prepared in the same manner as in Example 1 were mixed at a weight ratio of 1:1, thereby preparing a lubricant c. A magnetic disk of Example 2 was manufactured in the same manner as in Example 1 except that a lubricating layer was formed by the use of this lubricant c.

Example 3

Molecular weight fractionation of Fomblin Z-Diol (trade name), manufactured by Solvay Solexis, Inc., containing the lubricant compound (II) according to this invention was carried out by the supercritical fluid extraction method, thereby preparing a lubricant a having Mw of 3000 and a molecular weight dispersion of 1.08. Then, the lubricant a and a lubricant b prepared in the same manner as in Example 1 were mixed at a weight ratio of 4:6, thereby preparing a lubricant c. A magnetic disk of Example 3 was manufactured in the same manner as in Example 1 except that a lubricating layer was formed by the use of this lubricant c.

Then, the lubricants and the magnetic disks used in Examples 1 to 3 were evaluated by the following test methods.

(1) Fluidity

The fluidity was evaluated by setting the magnetic disk in a HDD with a rotational speed of 5400 rpm in a high-temperature environment, taking the magnetic disk out of the HDD after continuous operation for 500 hours, and measuring the thickness of the lubricating layer to confirm a thickness change before and after the test. The evaluation was performed by giving "O" when a thickness change hardly occurred, and "X" when a thickness change occurred.

(2) Surface Energy

Two or more kinds of liquids whose surface tensions were known were dropped on the surface of the magnetic disk and contact angles thereof were measured. Then, the surface free energy was derived by solving the Fowkes equation using the measured data of contact angles.

(3) OSA Inspection

Using an optical surface analyzer (OSA), the wear of the carbon film was observed by utilizing a phase shift upon reflection on the surface of the magnetic disk when an oblique wave (Q wave) split into an S wave and a P wave was irradiated on the surface of the magnetic disk. As a result, the evaluation was performed by giving "O" when there was no problem, "Δ" when the wear of the carbon film was slightly observed, and "X" when the degree of the wear was greater.

(4) CFT Property Test (Fixed-Position Flying Test)

The fixed-point position was set to the disk inner peripheral side (disk radius 15 mm position). The CFT test was performed in an environment at a temperature of 70° C. and a relative humidity of 80% for the purpose of being performed in a severe environment. As a result, the evaluation was performed by giving "O" when the magnetic disk endured fixed-point continuous flying for continuous four weeks and thus was extremely excellent in CFT properties even under the severe conditions, "Δ" when the magnetic disk failed before the lapse of continuous four weeks, and "X" when the magnetic disk failed before the lapse of continuous two weeks.

The results of the above are collectively shown in Table 1 given later.

Comparative Example 1

Molecular weight fractionation of a mixture, at a weight ratio of 1:1, of Fomblin Z-Tetraol (trade name), manufactured by Solvay Solexis, Inc., containing the lubricant compound (I) according to this invention and Fomblin Z-Diol (trade name), manufactured by Solvay Solexis, Inc., containing the lubricant compound (II) according to this invention was carried out by the supercritical fluid extraction method, thereby preparing a lubricant having Mw of 3000 and a molecular weight dispersion of 1.08. A magnetic disk of Comparative Example 1 was manufactured in the same manner as in Example 1 except that a lubricating layer was formed by the use of this lubricant.

Comparative Example 2

A magnetic disk of Comparative Example 2 was manufactured in the same manner as in Example 1 except that a lubricating layer was formed by the use of a lubricant b alone prepared in the same manner as in Example 1.

The lubricants and the magnetic disks used in Comparative Examples 1 and 2 were evaluated by the same test methods as for the Examples. The results are shown in Table 1 given below.

TABLE 1

| | Fluidity | Surface Energy | OSA Observation | CFT Property | Total Evaluation |
|---|---|---|---|---|---|
| Example 1 | O | 17-18 | O | O | O |
| Example 2 | O | 17-18 | O | O | O |
| Example 3 | O | 17-18 | O | O | O |
| Comparative Example 1 | O | 22 | X | X | X |
| Comparative Example 2 | O | 17-18 | Δ | Δ | Δ |

From the results of Table 1 given above, excellent results were obtained in Examples 1 to 3 in which use was made of the lubricant c in the form of the mixture of the lubricant a containing at least one compound selected from the lubricant compound (I) according to this invention and the lubricant compound (II) according to this invention and the lubricant b containing the lubricant compound (III) according to this invention. On the other hand, in Comparative Example 1 in which the lubricant a containing at least one compound selected from the lubricant compound (I) according to this invention and the lubricant compound (II) according to this invention was used alone and in Comparative Example 2 in which the lubricant b containing the lubricant compound (III) according to this invention was used alone, at least some of the evaluation results were bad so that good evaluation was not obtained as the total evaluation.

BRIEF DESCRIPTION OF THE DRAWINGS

FIG. 1 is an exemplary cross-sectional view of a magnetic disk according to one Example of this invention.

DESCRIPTION OF SYMBOLS 1 substrate
2 adhesive layer
3 soft magnetic layer
4 first underlayer
5 second underlayer
6 magnetic layer
7 carbon-based protective layer
8 lubricating layer
10 magnetic disk

The invention claimed is:

1. A magnetic disk having at least a magnetic layer, a protective layer, and a lubricating layer provided in this order over a substrate,
wherein the lubricating layer has properties of lowering the surface energy of the magnetic disk and enhancing the fluidity and CFT properties of the magnetic disk;
wherein the lubricating layer is formed by a film of a lubricant c containing a lubricant a containing a compound represented by a chemical formula

[Chemical Formula 1]

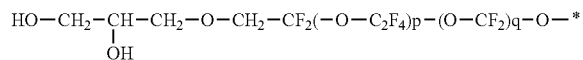

[in the formula, p and q are natural numbers]
and a compound represented by a chemical formula

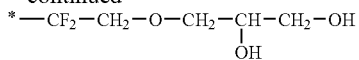
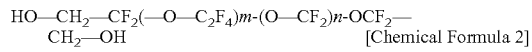
[Chemical Formula 2]

[in the formula, m and n are natural numbers]
and a lubricant b containing a compound represented by Chemical Formula 5 in which perfluoropolyether groups each having a perfluoropolyether main chain in a structure thereof and each having a hydroxyl group at an end thereof are bonded to each other through a divalent linking group having at least two hydroxyl groups in a structure thereof:

[Chemical Formula 5]

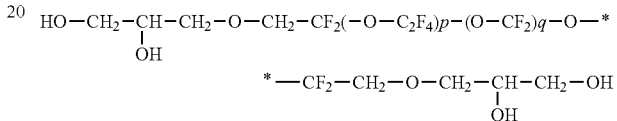

wherein Rf represents —(OC$_2$F$_4$)m(OCF$_2$)n- and m and n each represents an integer of 1 or more; and
wherein a weight-average molecular weight (Mw) of the lubricant a is in a range of 3000 to 7000, a number-average molecular weight (Mn) of the lubricant b is in a range of 1000 to 6000, and a weight ratio of the lubricant a:the lubricant b in the lubricant c is 4:6 to 6:4.

2. A magnetic disk according to claim 1, wherein the protective layer is a carbon-based protective layer formed by a plasma CVD method.

3. A magnetic disk according to claim 1, wherein the magnetic disk is adapted to be mounted in a magnetic disk device of a load unload system.

* * * * *